Aug. 28, 1951  J. H. DAVIDS  2,566,080
BUSHING ASSEMBLY
Filed Feb. 16, 1948  2 Sheets-Sheet 1

INVENTOR
JOHN HANS DAVIDS

ATTORNEY

Aug. 28, 1951     J. H. DAVIDS     2,566,080
BUSHING ASSEMBLY

Filed Feb. 16, 1948     2 Sheets-Sheet 2

INVENTOR
JOHN HANS DAVIDS

ATTORNEY

Patented Aug. 28, 1951

2,566,080

UNITED STATES PATENT OFFICE 2,566,080

BUSHING ASSEMBLY

John Hans Davids, Beloit, Wis., assignor to Fairbanks, Morse & Co., Chicago, Ill., a corporation of Illinois Application February 16, 1948, Serial No. 8,569

7 Claims. (Cl. 309—19)

This invention relates to bearing bushing assemblies and is particularly directed to such an assembly in connection with the operative mounting of means for connecting members which are arranged to transmit a load from one to the other of the members.

The subject of the present invention is adapted to wide usage in the machinery art, but it has particularly important utility in that portion of the machinery art having to do with internal combustion engine piston and connecting rod assemblies, and for that reason the following description will be devoted to such an application.

An important object of this invention is found in the provision of improved bearing bushings which are adapted to facilitate the free operation of a connecting means between working members arranged to transmit a force or load from one to another of the working member.

It is also an important object of the invention to provide a bushing assembly having means to receive and effect the distribution of a lubricant supplied thereto under pressure, so that all load bearing surfaces and areas of the assembly will be fully lubricated and at least certain of the bushings practically made to float on the lubricant when in working operation.

Another object hereof resides in the combination of bushing parts having improved means for conducting a lubricant to all critical areas in such manner as to maintain the same free of foreign matter, whereby to increase the ability of the bushing parts to withstand a wide range of loadings, particularly the loads developed on the pistons and transmitted to the connecting rods in heavy or continuous duty engines.

Other objects and important advantages resulting from the improved features of this invention will be more particularly described in connection with the accompanying drawing wherein only a preferred form and application of the invention has been llustrated.

Figure 1:
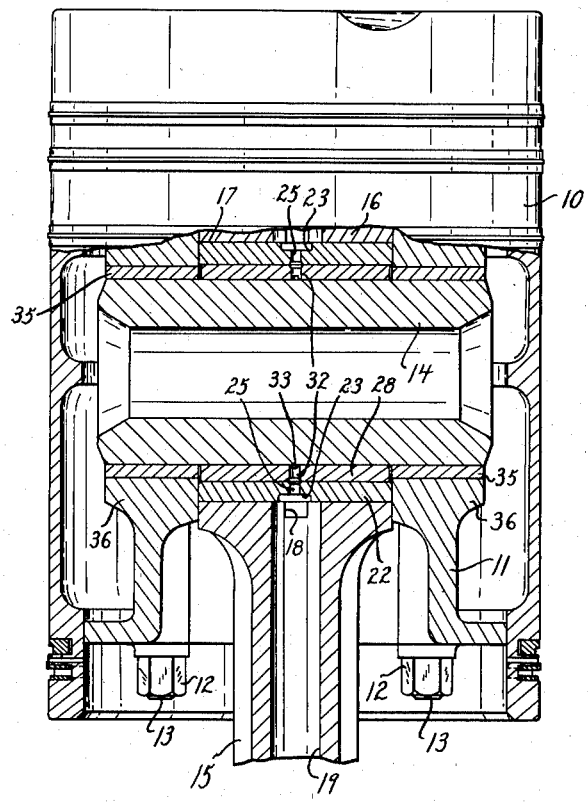
Fig. 1 is a side view, partly in section, of a piston, connecting rod and wrist pin assembly embodying the improved bearing bushings.
Figure 2:
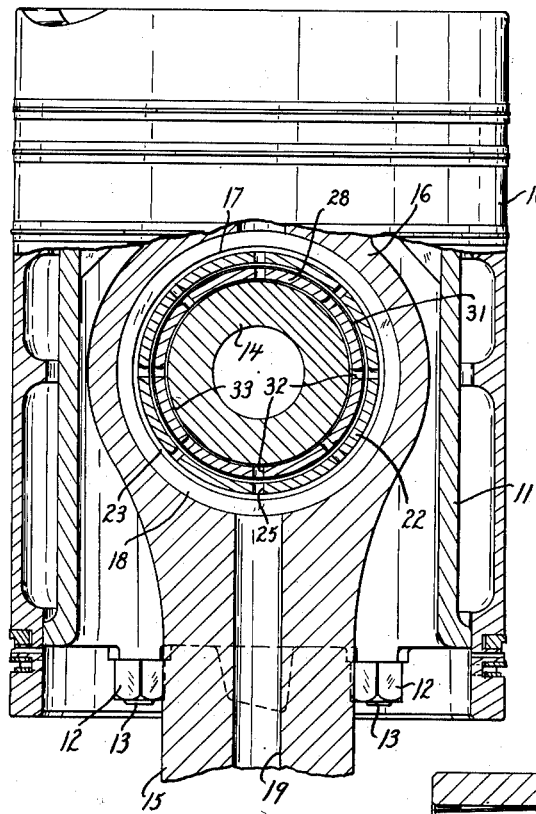
Fig. 2 is a view similar to that of Fig. 1 but taken at right angles thereto to show additional features of the bushing assembly.

The presently improved bushing assembly has been illustrated in assembly in connection with its application to a pair of members such as a piston and connecting rod for use in an internal combustion engine. The construction of one member, as the piston, is shown by Figs. 1 and 2, and includes a body 10 suitably formed to receive an insertable part 11 which is held in fixed position by cap nuts 12 engaging longitudinal studs 13. The insert part 11 acts as the carrier for a connecting means between the members, and is shown as a hollow type wrist pin 14 of cylindrical form. The other member of the pair is constituted by the connecting rod 15 provided with an upper enlarged end 16 in which an enlarged cylindrical bore 17 is formed, and this bore is circumferentially grooved at 18 and communicates at one point with the lubricant supply passage or bore 19 provided in the connecting rod 15. The connecting rod bore 19 is adapted to receive lubricant under pressure from a suitable supply connecting at the crankshaft end thereof (not shown) as is usually provided.

In effecting the connection of the piston member 10 with the rod member 15, it is first necessary to assemble the insert 11, wrist pin 14 and connecting rod 15, and then to place the piston body 10 in position over the insert 11 whereupon the cap nuts 12 may be threaded up to secure the members in proper working relationship.

Figure 3:
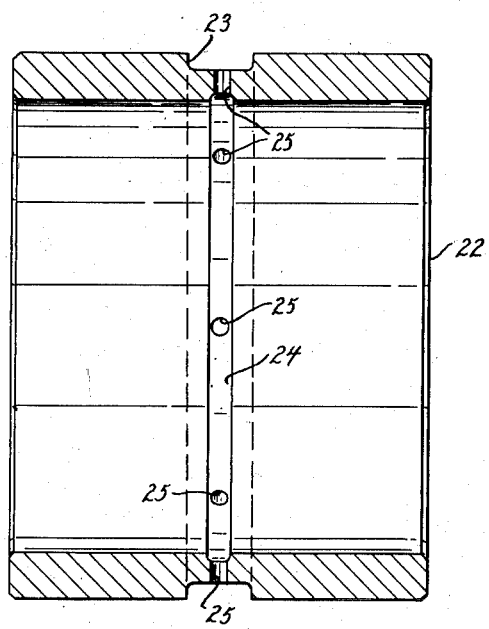
Fig. 3 is a sectional view of one of the bushing elements of the improved assembly.

According to the present improvements the enlarged bore 17 in the end 16 of the connecting rod is provided with a bushing element 22 (Fig. 3) having an outer annular groove 23 intermediate its ends, an inner annular groove 24 underlying the outer groove 23 and a series of circumferentially spaced, radially directed ports 25 affording communication between the inner and outer grooves 24 and 23 respectively. This bushing is preferably snugly fitted into the bore 17 of the connecting rod end portion 16 so that the groove 23 registers with the complementary groove or channel 18 of bore 17.

Figure 4:
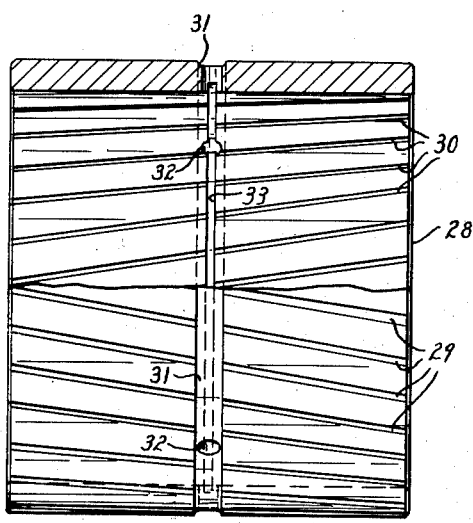
Fig. 4 is a partial sectional and broken view of a bushing element showing the arrangement of lubricant conducting means on its internal and external surfaces; and, Fig. 5 is a sectional view of a bushing element having internally disposed lubricant conducting means.

A second bushing element 28 (Fig. 4) is adapted to have a working fit internally of the connecting rod bushing 22, and this bushing 28 receives the wrist pin 14, as may be seen in Figs. 1 and 2. Bushing 28 may be termed a wrist pin bushing element, since it is disposed between the wrist pin 14 and bushing 22 and is adapted to have a working fit with each thereof. The characteristics of the wrist pin bushing element 28 (Fig. 4) are such as to facilitate the distribution of the lubricant particularly in the zone of highest bearing loads and to maintain a continuous film of the lubricant to the end that the bushing may, in effect, float between the wrist pin 14 and connecting rod bushing 22 on this film of lubricant. Accomplishment of this important feature is had by forming lubricant conducting means in the external and internal surfaces thereof, such means being shown at 29 and 30 respectively. In the forming of the bushing 28, the external lubricant conducting means or shallow grooves 29 are circumferentially spaced and generally helically directed relative to the axis of the bushing with a small degree of angularity. At approximately the mid zone of the grooves 29, a circumferential channel 31 is formed for the purpose of cooperating with the channel 24 in bushing 22 to receive the lubricant and distribute the latter to the adjacent ends of each of the helical grooves 29.

Bushing 28 is further provided with an internal series of circumferentially spaced shallow grooves as at 30, and these grooves are also helically directed relative to the bushing axis. Further, the internal grooves 30 are given a helical trend which is opposite to the external series of helical grooves 29. Lubricant attaining the outer circumferential channel 31 is fed to the inner series of helical grooves 30 by way of a multiplicity of spaced radial ports 32 which open into an inner circumferential channel 33. This inner channel 33 communicates with the adjacent ends of each of the shallow grooves 30 to distribute the lubricant thereto. Thus the outer and inner series of oppositely directed helical grooves 29 and 30 are copiously and freely supplied with lubricant under pressure, to the end that a positive outward flow of the lubricant occurs in each groove, and the whole of the outer and inner bearing surfaces receives a bath of lubricant sufficient to cause the desired floating condition of the bushing.

Figure 5:
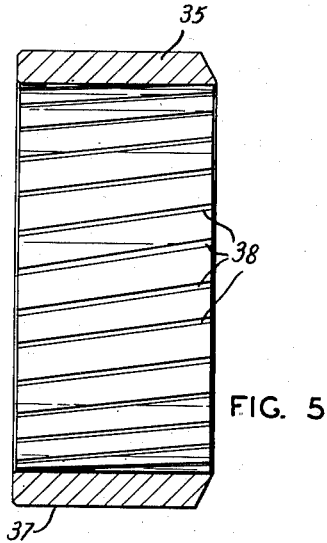

The wrist pin 14 is adapted to work in the floating bushing 28 and receives lubricant from the inner series of grooves 30 thereof. The opposite ends of the pin 14 project beyond the bushing 28 and are bearinged in bushing elements 35 carried by the insert 11 (Fig. 1) in suitable boss formations 36 formed integrally with the insert. The insert bushings 35 are indentical, thus only one bushing has been shown in Fig. 5 and this is to be taken as typical. Specifically, the bushing 35 is formed with a plain, cylindrical outer surface 37 and an internal surface having a series of lubricant conducting means or shallow grooves 38. These grooves 38 are generally helically directed relative to the bushing axis and at some small angularity which corresponds in general to the helical trend of the grooves 30 formed internally of the floating wrist pin bushing 28. In the normal assembled cooperativeness of the floating bushing 28 and the insert bushings 35, it can be appreciated that the flow of lubricant outwardly from channel 33 in bushing 28 along the helical grooves 30 thereof will afford the source of supply for the grooves 38 in each of the bushings 35.

The present form of bushings exhibit the important characteristic that the supply of lubricant is introduced at or near the center of the bushing assembly and flows under pressure in two directions along the grooves 29 and 30. From the outer ends of grooves 29 and 30 in bushing 28, the lubricant flows to the inner surfaces of each of the adjacent insert bushings 35 by way of the grooves 38 therein. This lubricant flow from the center toward each end of the bushing assembly most adequately and positively assures that the working and load bearing surfaces will be constantly flushed and maintained free of dirt and harmful foreign matter.

The foregoing description has been given in connection with an embodiment of the invention as applicable to a pair of working members such as a piston and connecting rod assembly. However, it should be understood and appreciated that the improvements in bushing means here disclosed may have a broader scope and useful application, without departing from the characteristics and underlying principles involved. Accordingly, the present improvements are not to be limited in any important respects except as the same may be required by the claims hereunto appended.

What is claimed is:

1. The combination of a pair of members arranged to transmit a load from one to the other thereof, a cylindrical pin operatively connecting said members for pivoting movement thereof, a first bushing element carried by one of said members and having circumferentially directed exterior and interior channels located intermediate its ends and ports opening therebetween for conducting a lubricant between said channels, a second bushing element adapted to work in said first bushing and receive said cylindrical pin in sleeved relation, said second bushing having a circumferentially directed exterior channel in registering relation and communication with the interior channel of said first bushing, a circumferentially directed interior channel located oppositely of the exterior channel, ports opening between said exterior and interior channels, and a series of helically directed grooves in its exterior and interior surfaces for directing lubricant over each of its working surfaces, and in a direction outwardly of said channels in both directions for flushing the working surfaces and grooves.

2. The combination of a piston having spaced bearing surfaces, a connecting rod formed with an enlarged end portion having a bearing bore opening therethrough, the bearing bore being circumferentially grooved intermediate its ends and the connecting rod having an axially directed lubricant supply passage open to said circumferential groove, a wrist pin operably mounted in said spaced bearing surfaces and connecting said piston and connecting rod, and a pair of concentrically related bushing elements disposed between said wrist pin and the bearing bore of said connecting rod end portion, the outer one of said bushing elements being provided with an exterior and an interior circumferentially directed groove intermediate its ends and spaced, radial ports opening between said grooves to conduct lubricant interiorly thereof, and the inner one of said bushing elements having an exterior and an interior circumferentially directed groove intermediate its ends, radial ports opening between said grooves and an interior and exterior series of helically directed grooves extending the length of the bushing element and intersecting the respective circumferentially directed grooves whereby lubricant may be freely and copiously supplied to the opposite surfaces of the bushing element for distribution outwardly toward each of the bearing surfaces in said piston.

3. The combination as defined by claim 2, and further including other bushing elements disposed one at each piston bearing surface to receive said wrist pin, each of said latter bushing elements having a series of helically directed grooves in its inner surface, such grooves being adapted to receive lubricant flowing outwardly from the series of helical grooves of the inner one of said concentric bushing elements.

4. The combination of a piston, connecting rod and wrist pin assembly, and a plurality of bushing elements disposed between said wrist pin and said piston and connecting rod, said plurality of bushing elements being comprised of spaced bushing elements seated in said piston, each formed to provide helically directed grooves in its bearing surface receiving said wrist pin, and a pair of concentrically related bushing elements disposed between said spaced bushing elements, one of said concentric bushing elements being formed intermediate its opposite ends with annular lubricant receiving grooves in its opposite surfaces and radially directed ports opening between the annular grooves thereof, and the other of said concentric bushing elements being formed with an interior series of helically directed grooves, an exterior series of helically directed grooves of a trend opposite to that of the interior series, and means centrally located and adapted to receive and conduct lubricant from the lubricant grooves of said one bushing element into each of said series of helical grooves, whereby such lubricant is freely and copiously supplied to the working surfaces of the concentric bushing elements, and is directed by said helical grooves toward said wrist pin and spaced bushing elements in said piston.

5. A bearing bushing of the character described, comprising a one-piece tubular member open at its ends and presenting inner and outer cylindrical bearing faces, said member having a lubricant-receiving channel extending circumferentially in the outer bearing face substantially mid-way of the ends of the member, and a plurality of lubricant-distributing grooves in the outer bearing face between said channel and each end of the member, each of said grooves having a generally helical trend in said bearing face, and the member further having lubricant-receiving channel means extending circumferentially in the inner bearing face, passage means communicating said channel means with said channel in the outer bearing face, and lubricant-distributing grooves in the inner bearing face between said channel means and the ends of the member.

6. A bearing bushing according to claim 5, wherein the grooves in the inner bearing face have a generally helical trend in said face.

7. A bearing bushing according to claim 5, wherein said channel means is constituted by a single channel in substantially underlying registry with the said channel in the outer bearing face.

JOHN HANS DAVIDS.

REFERENCES CITED

The following references are of record in the file of this patent:

UNITED STATES PATENTS

| Number | Name | Date |
|---|---|---|
| 1,823,437 | Cooper | Sept. 15, 1931 |
| 1,841,764 | Solver | Jan. 19, 1932 |
| 1,898,659 | Gardner | Feb. 21, 1933 |
| 2,106,860 | Tibbetts | Feb. 1, 1938 |
| 2,379,359 | Kettering | June 26, 1945 |
| 2,418,901 | Read | Apr. 15, 1947 |

FOREIGN PATENTS

| Number | Country | Date |
|---|---|---|
| 412,851 | Great Britain | July 5, 1934 |